United States Patent
Krappel et al.

[11] Patent Number: 6,144,111
[45] Date of Patent: Nov. 7, 2000

[54] CURRENT BREAKER FOR A VEHICLE BATTERY LEAD

[75] Inventors: Alfred Krappel, Ismaning; Robert Albiez, Reichertshofen; Maximilian Groebmair, Dietramszell; Bernhard Fahrnbauer, Munich, all of Germany

[73] Assignees: Bayerische Motoren Werke Aktiengesellschaft, Munich; Auto-Kabel Hausen GmbH & Co. Betriebs-KG, Hausen, both of Germany

[21] Appl. No.: 09/125,602

[22] PCT Filed: Feb. 20, 1997

[86] PCT No.: PCT/EP97/00812

§ 371 Date: Dec. 23, 1998

§ 102(e) Date: Dec. 23, 1998

[87] PCT Pub. No.: WO97/31385

PCT Pub. Date: Aug. 28, 1997

[30] Foreign Application Priority Data

Feb. 21, 1996 [DE] Germany ............................ 196 06 447

[51] Int. Cl.[7] ................................................. B60L 1/00
[52] U.S. Cl. ................... 307/10.1; 307/10.2; 307/10.7
[58] Field of Search ...................... 200/61.47, 81, 200/82; 337/30, 401; 307/10.7, 10.1, 10.2; 318/139; 439/258, 50–1

[56] References Cited

U.S. PATENT DOCUMENTS

| | | | |
|---|---|---|---|
| 2,983,801 | 5/1961 | Billiard | 200/81 |
| 3,120,591 | 2/1964 | Lewis et al. | 200/82 |
| 5,602,371 | 2/1997 | Kerns et al. | 200/61.47 |

FOREIGN PATENT DOCUMENTS

| | | | |
|---|---|---|---|
| 0664455A | 8/1995 | European Pat. Off. | H01H 39/00 |
| 0665566A | 8/1995 | European Pat. Off. | H01H 39/00 |
| 1269325A | 7/1961 | France . | |
| 2616958A | 12/1988 | France | H01H 35/14 |
| 9401486 U | 6/1994 | Germany | H01H 39/00 |

*Primary Examiner*—Stephen W. Jackson
*Assistant Examiner*—Sharon Polk
*Attorney, Agent, or Firm*—Evenson, McKeown, Edwards & Lenahan, P.L.L.C.

[57] ABSTRACT

In a current interrupter for a battery lead for motor vehicles, with a contact element between the two connecting parts for their electrical connection and with an auxiliary drive for separating the two connecting parts, contact element applies only a transverse force that is directed essentially perpendicularly to the connecting parts. A retaining force which is directed opposite to the action of the auxiliary drive is mainly applied at one point and is spatially separated from the contact element.

12 Claims, 4 Drawing Sheets

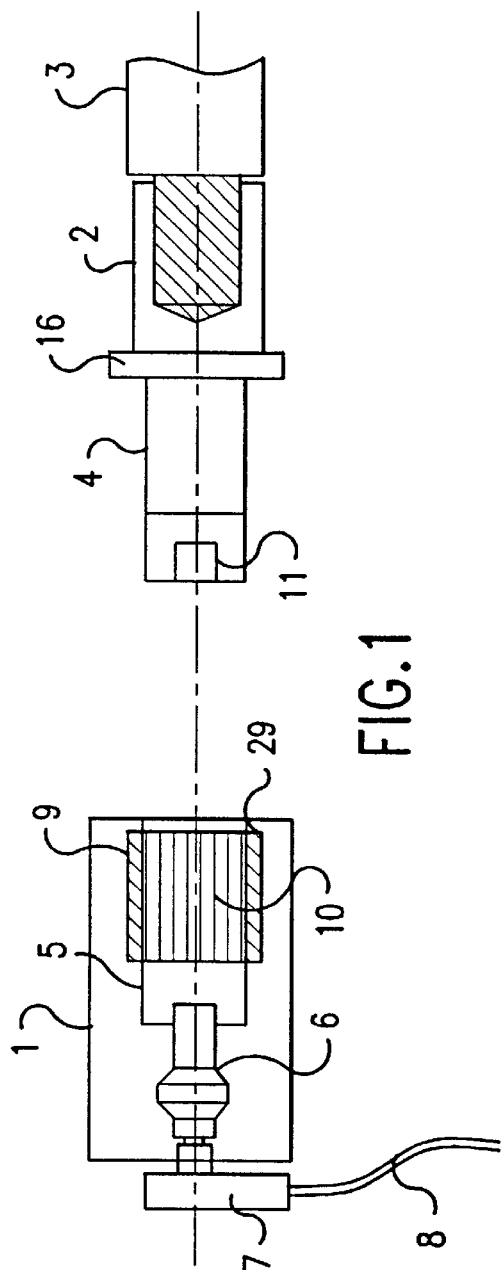
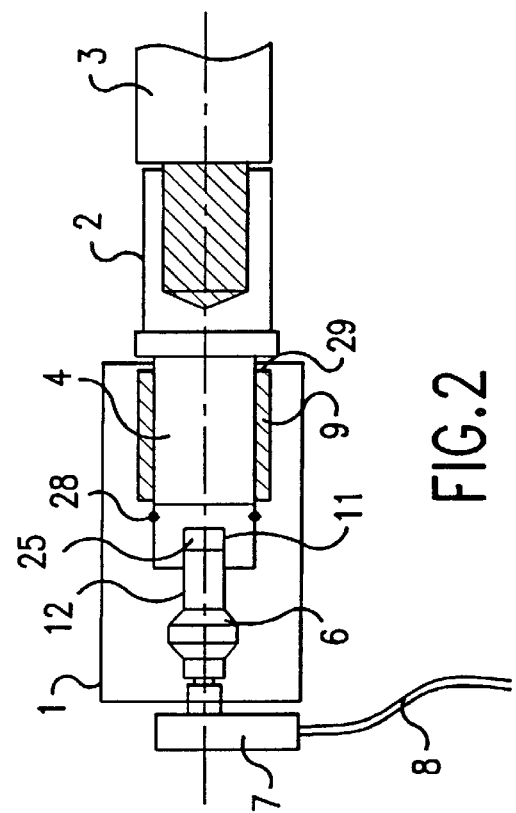

CURRENT BREAKER FOR A VEHICLE BATTERY LEAD

BACKGROUND AND SUMMARY OF THE INVENTION

The invention relates to a current interrupter, with a contact element between the two connecting parts for its electrical connection and with an auxiliary drive for separating the two connecting parts.

A current interrupter of this kind is known from DE 44 02 994 A1. The contact element, for example, is designed as a surrounding spring basket and also assumes the function of keeping the two connecting parts in an operating position. This results in a connection between the two connecting parts that is difficult to access mechanically. This also allows the danger to persist during manufacturing that the two connecting parts will not be entirely placed 100% in their most effective position. The result is that the function of the current interrupter may not be guaranteed in all cases. The function depends on the efficacy of the auxiliary drive.

In DE 44 02 994 A1, the auxiliary drive is provided by a propellant charge that is ignited (if necessary) and generates a specific amount of gas. Since it is an explosive body, the quantity of explosive is measured exactly and is as small as possible. The quantity is set for the case in which the two connecting parts are located exactly in the active position. If this is not the case, the gas quantity generated may not suffice to reliably separate the other connecting parts from one another. On the other hand, the quantity of explosive cannot be made overly large, since if the two connecting parts are in their proper effective position, this leads to an excessive acceleration of the two contact parts, which in turn is a dangerous situation.

The possibility of omitting the contact part while ensuring both the function of the electrical junction and the retaining force at the location of the electrical backward snap connection with the aid of a (press) fit, does not achieve the object of the present invention. The fit depends on the manufacturing tolerances of the contact surfaces on the one hand and the curve of the pressing force as the two connecting parts are being fitted together, on the other hand. These influential parameters are problematic during the process and result in considerable manufacturing expense, since the pressing force must be guided during the pressing process, for example. Simultaneously, as a result of increased manufacturing cost, where the two connecting parts join the tolerance between the two connecting parts must be kept small.

The object of the invention is to provide a current interrupter which, from a manufacturing standpoint, functions in a safe, reliable and simple manner.

This and other objects and advantages are achieved by the current interrupter, in which the spatial separation of the electrical junction and the location where the retaining force is applied also offers the possibility of adjusting this retaining force independently of the electrical connection. It is then possible not to initially apply the retaining force during manufacture, for example, and to fit the two connecting parts together in a simple loose manner. The electrical junction is then ensured. It is only after manufacture is complete, and it is possible to separate the two connecting parts from one another at any time, that the retaining force is applied by suitable means. This can be accomplished by welding the two connecting parts together, for example.

The possibility of simply separating the two connecting parts from one another, during manufacture for example, and then fitting them together again is achieved most simply where the contact element (as is known) is a circumferential spring basket. However, the dimensions must be adapted to the transverse force so that this transverse force not only produces a good electrical contact, but does not produce a frictional connection between the two connecting parts.

In contrast to the possibility of applying the retaining force by welding the two connecting parts, an advantageous design of the current interrupter is obtained if the retaining force is applied by a housing that is closed around the two connecting elements after the electrical connection is made. Such a housing (advantageously made of plastic) is simple to manufacture and can be accomplished safely and reliably as far as the design features are concerned. The housing can be designed in various ways.

In a first embodiment of the present invention, the housing can be adapted to the external shape of the connecting parts so that it can be closed only when the two connecting parts are in their effective positions.

In a second embodiment of the present invention, the housing can also be provided with breaking elements that produce the desired retaining force. These breaking elements, for example, can be placed in the path of movement of one connecting part. When the auxiliary drive is triggered, the breaking elements initially prevent the movement of the two connecting parts relative to one another. Furthermore, it is only when the auxiliary drive is fully operational that the retaining force exceeds the driving force produced by it. The breaking elements then abruptly allow the movement of one of the two connecting parts. The momentum that is then present will reliably accelerate the movable contact part out of the fixed contact part and break the connection. As a result of the retaining force of the breaking elements, which can be determined by the shape and material of the breaking element, the dynamics of the process of separation of the connecting parts can also be controlled.

In another embodiment of the invention, the housing can also be made in two parts and have a specific breakaway force. The effect of the two housing halves corresponds to that of the breaking elements.

In still another embodiment of the invention, the housing can be designed so that it acts as a cage for the two connecting parts, even when they are pulled apart from one another by the auxiliary drive. As a result, the movement of the connecting parts away from one another is limited and external protection is achieved. By suitable design measures, it is also possible to prevent a backward movement of the connecting parts toward one another and thus to eliminate a renewed contact between the two connecting parts.

The invention will now be described in greater detail with reference to the drawings.

BRIEF DESCRIPTION OF THE DRAWINGS

FIG. 1 shows a part of a first embodiment of the current interrupter according to the invention in the open state;

FIG. 2 shows a current interrupter in FIG. 1 in the closed state;

DETAILED DESCRIPTION OF THE DRAWINGS

Figure 3:
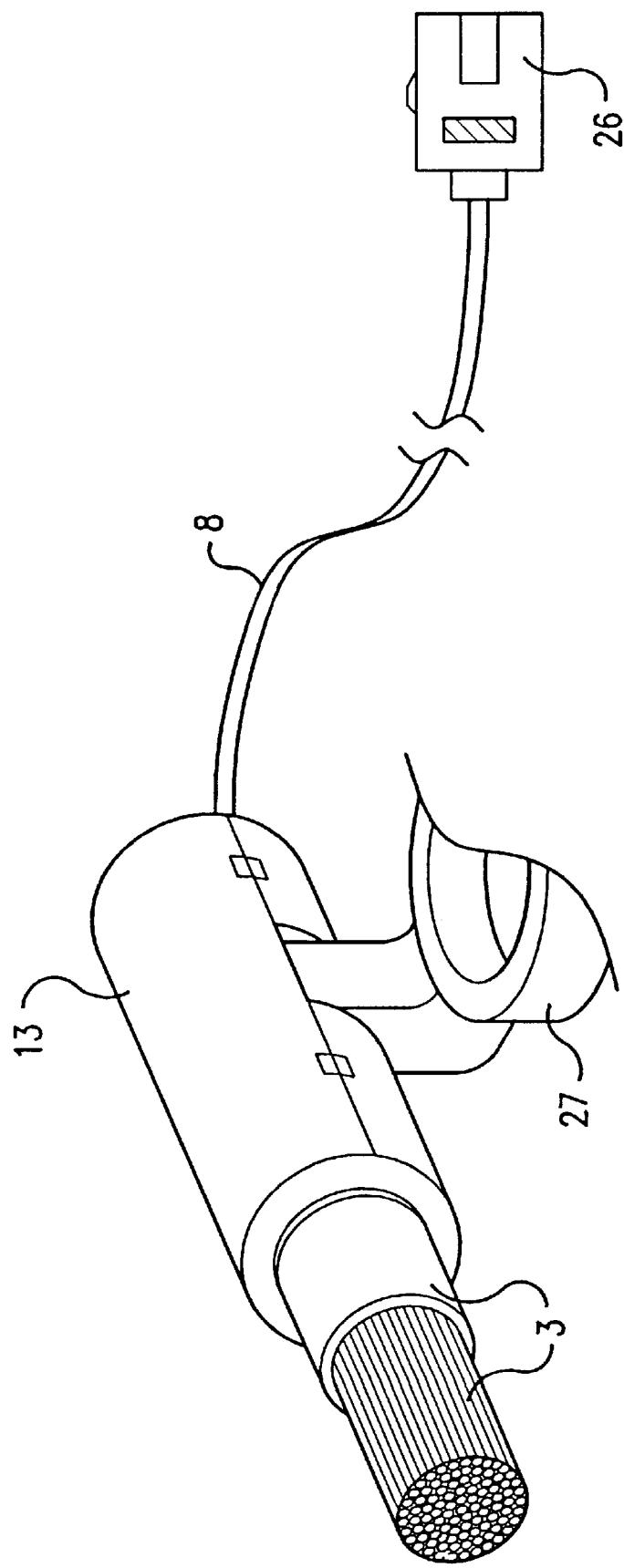
FIG. 3 is a perspective view of the complete current interrupter in FIGS. 1 and 2.

The current interrupter partially shown in FIG. 1 consists essentially of two connecting parts 1 and 2, of which part 1 is connected with a battery clamp 27 (not shown), and part 2 is connected with a battery lead 3. Part 2 can be plugged via a cylindrical projection 4 into a hollow cylinder 5 of part 1. At the end of hollow cylinder 5 is an explosive capsule 6 connected by a plug 7 with a control device (not shown). The leads 8 extending to the control device are indicated here.

In the wall of hollow cylinder 5 is a spring basket 9 which forms the electrical connection between parts 1 and 2 via spring blades 10. The spring basket can be secured in part 1 by an undercut 29 (FIGS. 1 and 2), or alternatively via one or more welded or glued locations (not shown). This can be seen in FIG. 2. Part 2 can also have a hollow cylinder 11 at its end which, in the plugged-in state, surrounds explosive capsule 6 in front area 12 and in this way sets a specific preliminary volume 25.

Figure 4:
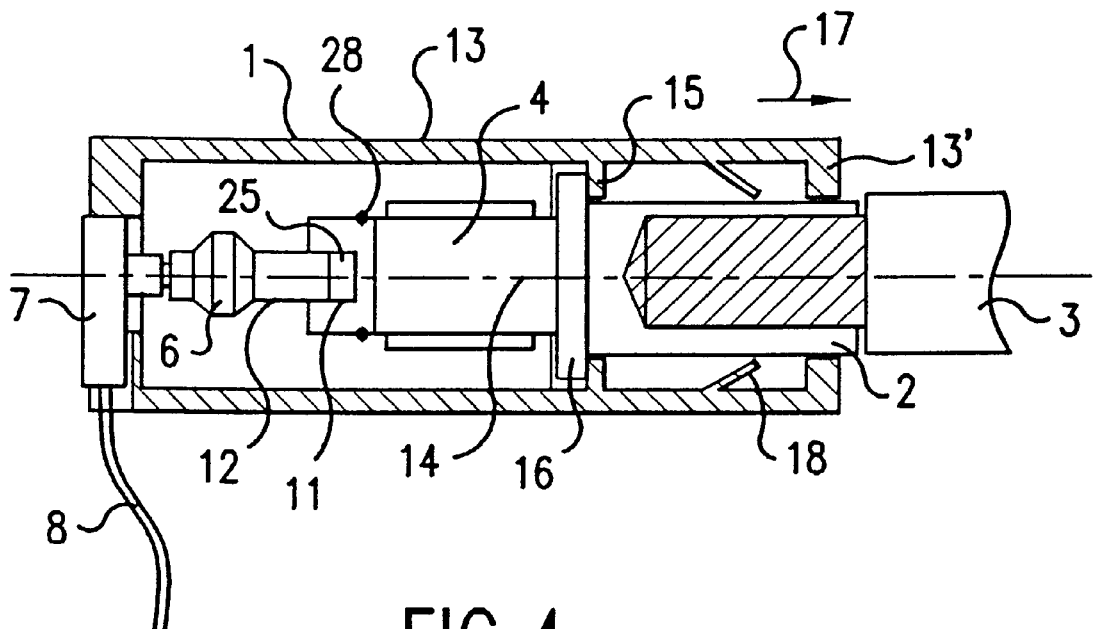
FIG. 4 shows a section through the current interrupter in FIG. 3.

The system composed of the two connecting parts 1 and 2 (shown in FIGS. 1 and 2) is clipped into a housing 13 and has the external appearance shown in FIG. 3. The current interrupter shown in FIG. 3 is shown in section in FIG. 4. Housing 13 is divided along midline 14, for example, and designed so that it can be closed only when the current interrupter is in the assembled state as shown in FIG. 2. The housing then grips a bead 16 of part 2 by an annular shoulder 15. Annular shoulder 15 acts as a breaking element and its wall thickness is set for the explosive force of explosive capsule 6.

In a serious accident, explosive capsule 6 is triggered by the control device (an airbag control device, for example). Explosive capsule 6 abruptly releases a given quantity of gas from the front part 1 of explosive capsule 6; the gas fills the adjoining preliminary volume 25. As a result of the abrupt release of a considerable quantity of gas, there is a strong pressure buildup inside the preliminary volume 25 between parts 11 and 12. This has the effect of driving part 2 out of part 1. Until this point in time, annular shoulder 15 has prevented movement of part 2, in other words until a sufficient quantity of gas has been released and a sufficient pressure has therefore been generated. Suddenly, however, annular shoulder 15 breaks away and allows part 2 to move freely.

Restraint of part 2 by the plastic housing is necessary to avoid an increase in the preliminary volume when the gas pressure is still low. Movement when the gas pressure is too low would enlarge the preliminary volume, and the quantity of gas supplied by the ignition capsule would no longer suffice to produce the required gas pressure and hence the expulsion force. As a result, a reliable separation could no longer be guaranteed. If, on the other hand, the preliminary volume is kept constant up to the gas pressure/expulsion force determined by the plastic housing, the momentum resulting from the breaking of the plastic restraint will suffice to reliably accelerate part 2 out of part 1 and to electrically separate parts 1 and 2 from one another.

Part 2 moves in the direction of arrow 17, relative to part 1 inside housing 13, and strikes rear wall 13' of housing 13 with bead 16. At this point, the housing is dimensioned so that the kinetic energy of part 2 is insufficient to destroy rear wall 13'. At the same time, retaining elements 18, located inside the rear part of the housing, once more assume the indicated position and prevent movement of part 2 in the direction of part 1. Part 2 is thus retained between rear wall 13' and retaining elements 18 by its shoulder 16.

A precondition for the effectiveness of the system shown in FIGS. 1 to 4 is the adjustment to the wall thickness of annular shoulder 15, the explosive effect of explosive capsule 6, and the volume formed by parts 11 and 12. Another precondition is the fact that spring basket 9 has a holding power that is negligible in comparison to the restraining force of annular shoulder 15. At the same time, the latter offers the possibility, before the destruction of housing 13, to be able to disconnect the two connecting parts 1 and 2 from one another at any time with no difficulty. This is advantageous during manufacture for checking the electrical characteristics, for example, and for facilitating the assembly process.

At the same time, the system shown is especially easy to repair. After explosive capsule 6 has been triggered, the system can be re-armed again, with only housing 13 and part 1 (with the battery clamp) having to be replaced. For this purpose, plug 7 is simply pulled off previous part 1 and pushed onto the replacement part. Part 1 is then plugged into part 2. Then a new housing is mounted. The entire system is then in perfect functioning condition.

Figure 6:
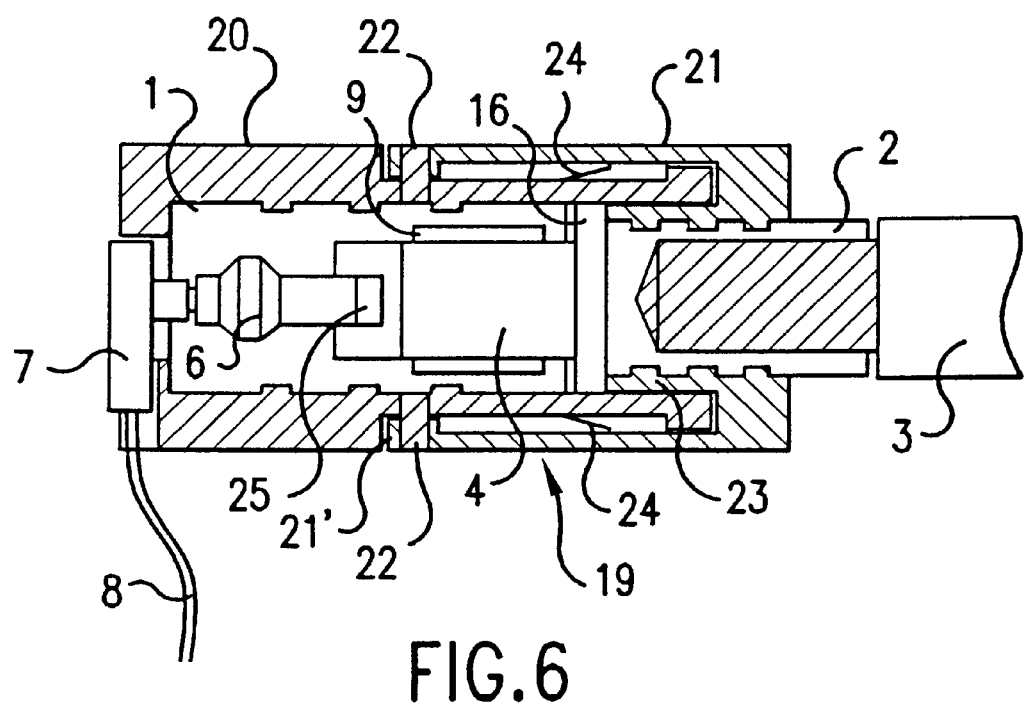
FIG. 6 shows a section of the current interrupter in FIG. 5.
Figure 5:
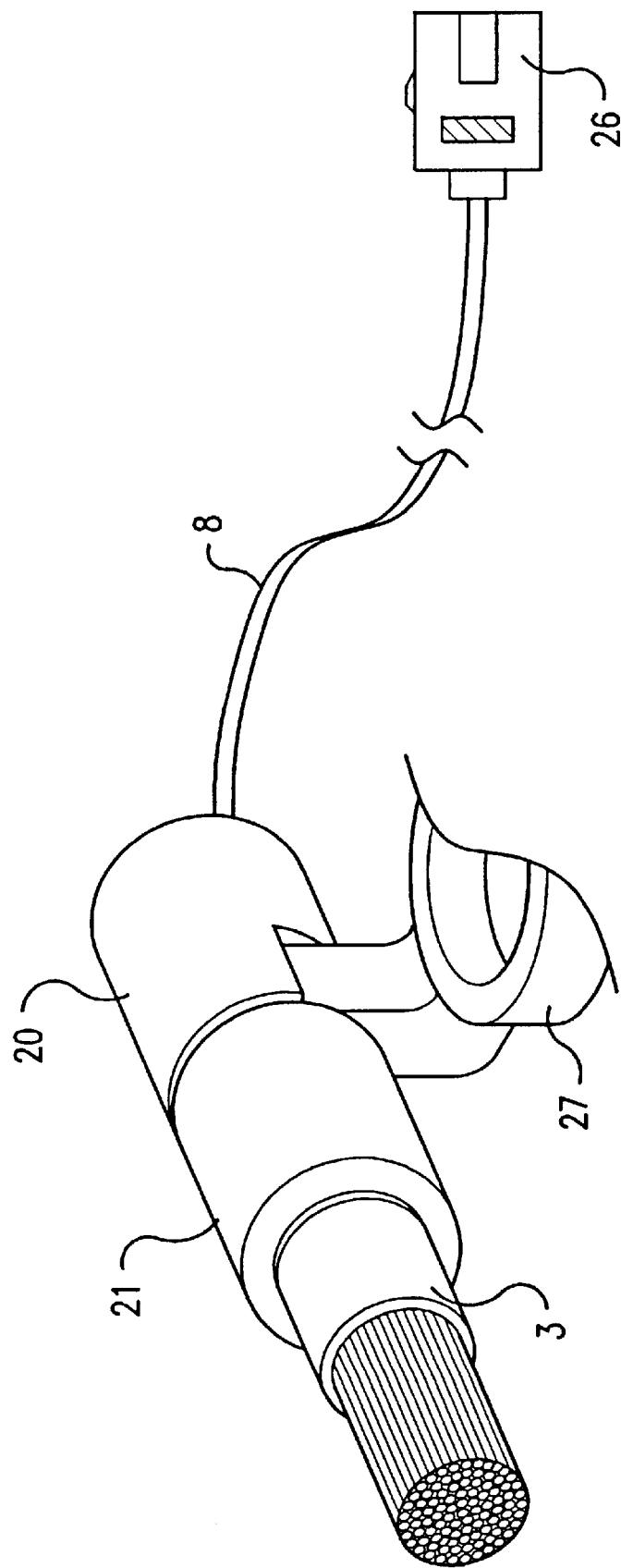
FIG. 5 is the second embodiment of the invention in a perspective view.

In the embodiment in FIGS. 5 and 6, housing 19 is divided into two parts similarly to housing 13 in FIGS. 1 to 4. The two housing halves 20 and 21 are connected with one another by several pins 22. Housing half 21 has a cylindrical projection 23 that fits behind bead 16.

Upon triggering, pins 22 are destroyed at a specific gas pressure. The housing half 21 travels like a gun carriage over the outside wall of housing half 20 and comes to rest at the end of housing half 20. The front part 21' of housing half 21 is then located at the end of half 20 and is held by restraining elements 24.

FIG. 5 also shows the possibility of connecting the control lead to the triggering electronic circuit through a plug connection 26.

Under certain conditions, it may be necessary to have increased gas pressure in the preliminary volume. It is theoretically possible to do this by using an O-ring 28 (FIGS. 2, 4) or a lip seal 28 which functions when a connection is made between hollow cylinder 5 and cylinder 4 of the movable part.

It is also possible to use a separate plastic part (not shown) with a sealing function 28 that is located above explosive capsule 6 in hollow cylinder 5 in front of cylinder 4 of movable part 2. The sealing function can be also be achieved by ensuring that the plastic part fits closely, or by sealing elements associated with the plastic part. In addition, the plastic part can act as an insulating part when the connection is broken.

What is claimed is:

1. A current interrupter for a battery lead in vehicles, comprising:

a first connecting part;

a second connecting part;

a contact element arranged between the first connecting part and the second connecting part; and an auxiliary drive disposed in the first connecting part for separating the first connecting part from the second connecting part;

wherein the contact element applies a transverse force directed perpendicularly to the first and second connecting parts, and a retaining device, for applying a retaining force directed between the first and second connecting parts opposite to an action of the auxiliary drive, is positioned so as to apply the retaining force at a location spatially separate from the contact element.

2. The current interrupter according to claim 1, wherein the contact element comprises contact blades forming a circumferential spring basket.

3. The current interrupter according to claim 1, wherein the first and second connecting parts are movable relative to one another via the auxiliary drive and are disposed in a housing which applies the retaining force.

4. The current interrupter according to claim 2, wherein the first and second connecting parts are movable relative to one another via the auxiliary drive and are disposed in said retaining device which applies the retaining force.

5. The current interrupter according to claim 3, wherein the retaining device is a housing closable only in a functionally reliable state of the current interrupter.

6. The current interrupter according to claim 4, wherein the housing is closable only in a functionally reliable state of the current interrupter.

7. The current interrupter according to claim 3, wherein the retaining device is a housing having breaking elements that retain the connecting parts in an effective position.

8. The current interrupter according to claim 4, wherein the housing has breaking elements that retain the connecting parts in an effective position.

9. The current interrupter according to claim 5, wherein the housing has breaking elements that retain the connecting parts in an effective position.

10. The current interrupter according to claim 6, wherein the housing has breaking elements that retain the connecting parts in an effective position.

11. The current interrupter according to claim 5, wherein the housing has two halves that can be separated from one another by a specific breakaway force.

12. The current interrupter according to claim 7, wherein the housing has two halves that can be separated from one another by a specific breakaway force.

* * * * *